United States Patent [19]

Hogan, Jr. et al.

[11] 3,907,976

[45] Sept. 23, 1975

[54] CONTINUOUS PROCESS FOR PREPARING POTASSIUM FLUOTANTALATE CRYSTALS

[75] Inventors: Isaac R. Hogan, Jr., East St. Louis; Ervin B. Inskip, Edwardsville, both of Ill.

[73] Assignee: Mallinckrodt, Inc., St. Louis, Mo.

[22] Filed: Nov. 29, 1974

[21] Appl. No.: 527,981

[52] U.S. Cl. ............................................. 423/464
[51] Int. Cl.² .................... C01G 35/00; C01D 3/02
[58] Field of Search ......................... 423/464, 65

[56] References Cited
UNITED STATES PATENTS

| | | | |
|---|---|---|---|
| 2,888,320 | 5/1959 | McCord | 423/464 X |
| 3,012,877 | 12/1961 | Foos et al. | 423/464 UX |
| 3,653,850 | 4/1972 | Eberts | 423/464 X |

OTHER PUBLICATIONS

Chemical Engineering, Sept. 1948, p. 152.

*Primary Examiner*—Edward Stern
*Attorney, Agent, or Firm*—R. J. Klostermann; L. N. Goodwin

[57] ABSTRACT

A continuous process for preparing crystals of potassium fluotantalate by mixing an aqueous solution of fluotantalic acid with an aqueous solution of a potassium compound to form a reaction mixture in which crystals of potassium fluotantalate form and removing the reaction mixture containing such crystals.

7 Claims, No Drawings

CONTINUOUS PROCESS FOR PREPARING POTASSIUM FLUOTANTALATE CRYSTALS

BACKGROUND OF THE INVENTION

1. Field of the Invention

This invention relates to a continuous process for preparing crystals of potassium fluotantalate and to the potassium fluotantalate so produced.

2. Description of the Prior Art

Fluotantalate crystals are currently produced utilizing a batch process. Generally 2,000 to 3,000 gallons of fluotantalic acid are heated to 95° C. in a 5,000 gallon rubber-lined tank. To this is added sufficient preheated (95° C.) potassium chloride solution to react with the fluotantalic acid. The combined solution is allowed to cool and shortly thereafter crystals start to grow on the inside of the tank. After all the crystals have formed, the mother liquor is removed by decanting. The crystals are usually recovered by pushing them through the bottom of the tank. Any crystals adhering to the sides are removed by mechanical means.

Considerable time and labor are involved in this recovery procedure and, sometimes, the crystals are contaminated because of the mechanical means employed; Accordingly, a process for producing potassium flutantalate crystals that does not have these disadvantages would be an advancement in the art.

BRIEF DESCRIPTION OF THE INVENTION

According to this invention a continuous process for preparing potassium fluotantalate crystals having a density of from about 10 pounds/gallon to about 25 pounds/gallon, a particle size such that no more than about 10% pass through a −325 U.S. standard mesh screen and having occluded moisture present in an amount less than 0.04% by weight, based on the total weight of the crystals was surprisingly found, which comprises A. forming a reaction mixture in which crystals of potassium fluotantalate form by continuously mixing (1) an aqueous solution of potassium compound having a temperature of from about 20° C. to about 40° C. and (2) an aqueous solution of fluotantalic acid having a temperature of from about 20° C. to about 40° C. at a rate such that the potassium compound is present in the reaction mixture in an amount which about equals or slightly exceeds the stoichiometric amount needed to react with the fluotantalic acid present in said reaction mixture.

B. removing said reaction mixture containing potassium fluotantalate crystals.

By practicing the process of this invention procedures for separating and recovering potassium fluotantalate crystals are improved. Furthermore, the process of the invention provides a crystal containing very little occluded moisture which is very advantageous in the end use of the crystals.

DETAILED DESCRIPTION OF THE INVENTION

As mentioned fluotantalic acid is utilized in the process of this invention. It is prepared in the usual manner from columbite-tantalite ore or any other tantalum bearing material. Any concentration of fluotantalic acid in the aqueous solution may be used. A useful concentration is from about 6% to 24% preferably 12% to 18% by weight based on $Ta_2O_5$ content of the solution.

As mentioned, potassium compounds are utilized in the present invention. Any potassium compound soluble in water at 40° C. may be used in the practice of this invention. They include: potassium acetate, potassium bromide, potassium carbide, potassium carbonate, potassium citrate, potassium fluoride, potassium formate, potassium hydroxide, potassium iodide, potassium molybdate, potassium nitrate, potassium phosphate and potassium sulfide. Potassium chloride is preferred. Any concentration of the potassium compound in the aqueous solution may be used. A useful concentration is from about 10% to about 40% preferably from about 15% to about 25% by weight, based on the total weight of the solution.

Generally the aqueous solution of the potassium compound is mixed with the fluotantalic acid at a rate such that the potassium compound is present in the reaction mixture in an amount which equals or is slightly in excess of the stoichiometric amount of potassium compound which is required to react with the fluotantalic acid. It is preferred that the potassium be present in an excess of from about 1% to about 20%, preferably from about 5% to 10%. Alternatively, this excess of potassium compound may be added to the aqueous heel hereinafter described.

Since the potassium fluotantalate crystals once formed are subject to hydrolysis, it is preferred to use a material that retards hyrolysis such as hydrofluoric acid. Generally it is present in the reaction mixture in an amount of from about 1% to about 4%, by weight, based on the total weight of the reaction mixture. It can be added directly to the reaction mixture or added along with the aqueous solution of the potassium compound or the fluotantalic acid.

As mentioned the aqueous solutions are continuously mixed to form the reaction mixture. If they are added to an empty vessel, it will take some time for crystallization to reach a steady state. Accordingly it is preferred to initially have an aqueous heel, containing water and potassium fluotantalate seed crystals in the tank prior to the addition of the aqueous solution of fluotantalic acid and aqueous solution of the potassium compound. Generally about 10% to about 30%, preferably from about 15% to about 20% by weight, based on the total weight of the heel of potassium fluotantalate crystals are present in the aqueous heel. Usually they have a particle size such that no more than about 10% pass through a −325 U.S. standard mesh screen.

The temperature of the reaction mixture is generally from about 20° C. to about 40° C. while the crystals are forming. Usually, the reaction mixture is agitated. It is preferred that the reaction mixture be rapidly agitated.

As mentioned, the reaction mixture containing the potassium fluotantalate crystals is removed. Usually, it is removed continuously at a rate which is about equal to the total rate of addition of the potassium compound and fluotantalic acid. Alternatively the reaction mixture is intermittently removed in portions usually not exceeding 10% of the total reaction mixture volume.

After removing the reaction mixture, the crystals are recovered in any of the usual manners. For example, the aqueous portion is decanted and the crystals dried to remove all surface moisture. Any of the usual driers may ve utilized.

The dried crystals of this invention have a bulk density of from about 10 pounds/gallon to 25 pounds/gallon preferably about 15 pounds to 20 pounds/gallon.

The particle size is such that no more than about 10% pass through a −325 U.S. standard mesh screen. There is no upper limit on the particle size, but a useful upper limit is one where 95% of the particles pass through a 20 U.S. standard screen. The particles have occluded moisture, that is, moisture that cannot be removed by ordinary drying, present in an amount less than 0.04% preferably less than 0.03% by weight, based on the weight of the crystals. The invention will now be illustrated by the following example.

EXAMPLE 1

The following equipment was utilized in preparing the potassium fluotantalate crystals.

Crystallizer 25 gallon polyethylene tank, 28 inches high by 18¼ inches in diameter, ½ inch outlet with valve just below the 20 gallon mark, ½ inch outlet with valve as close to the bottom as possible.

Stirrer

Variable speed air motor fitted with a 3 blade 11 inch right hand propeller.

Hold Tank

Two 50 gallon polyethylene tanks, one for the aqueous tantalic acid and the other for the potassium chloride and hydrofluoric acid solution.

Steam Blow

Provides steam to hold crystallizer temperature between 30° − 35° C.

Pumps

Two Masterflex variable speed tubing pumps.

Procedure

One of the 50 gallon hold tanks was filled with an aqueous solution of fluotantalic acid equivalent to 1 pound of tantalum oxide ($Ta_2O_5$)/gallon. To the other tank was added 82.5 pounds of potassium chloride and 6.4 gallons of 48% hydrofluoric acid. Water was added to 48 gallons and the ingredients were stirred until they dissolved.

To the crystallizer was added 25 pounds of potassium fluotantalate seed crystals (−40 +200 mesh), 0.8 gallons of 48% hydrofluoric acid and 1.10 pounds of potassium chloride. This was diluted to 20 gallons with water and stirred until mixed.

The stirrer was then turned on in the crystallizer and set at 170 revolutions per minute. The temperature was maintained at 34° C. by steam blow. The tantalum and the potassium chloride pumps were turned on simultaneously. The tantalum pump was set to deliver 10.5 gallons per hour at a point near the side of the tank about 2 inches above the bottom. The potassium chloride pump was set to deliver 4.5 gallons per hour at the surface on the opposite side of the tank from the tantalum entry.

Every five minutes a valve was opened and 1.25 gallons of slurry was removed alternately from the top to the bottom. The crystals were allowed to settle to the bottom of the container and the mother liquor was decanted off. The wet crystals were transferred to a filter and washed with water to remove the mother liquor. The washed crystals were dried at 100° C. to remove surface moisture. The production rate was 18.5 pounds of potassium fluotantalate per hour.

The dried product had a particle size distribution as follows:

+ 40 U.S. standard mesh 26%
+ 60 U.S. standard mesh 40.4%
+100 U.S. standard mesh 28.6%
−100 U.S. standard mesh 4.8%
−200 U.S. standard mesh 0.2%
−325 U.S. standard mesh 0 the bulk density was 18.3 pounds per gallon, and 0.028% occluded moisture was present.

From a consideration of the above specifications it will be understood that many improvements and modifications in the details may be made without departing from the spirit and scope of the invention.

It is to be understood therefore that the invention is not limited except as defined by the appended claims.

What is claimed is:

1. A continuous process for preparing potassium fluotantalate crystals having a density of from about 10 pounds/gallon to about 25 pounds/gallon, a particle size such that no more than about 10% pass through a −325 U.S. standard mesh screen and having occluded moisture present in an amount less than 0.04% by weight, based on the total weight of the crystals, which comprises A. forming a reaction mixture in which crystals of potassium fluotantalate form by continuously mixing (1) an aqueous solution of a potassium compound having a temperature of from about 20° C. to about 40° C. and (2) an aqueous solution of fluotantalic acid having a temperature of from about 20° C. to about 40° C. at a rate such that the potassium compound is present in the reaction mixture in an amount which about equals or slightly exceeds the stoichiometric amount needed to react with the fluotantalic acid present in said reaction mixture B. removing said reaction mixture containing potassium fluotantalate crytals.

2. A process according to claim 1 wherein said crystals have a bulk density in the range of from about 15 pounds/gallon to about 20 pounds/gallon.

3. A process according to claim 2 wherein the potassium compound is added in amount slightly above the stoichiometric amount necessary to react with the fluotantalic acid.

4. A process according to claim 3 wherein said reaction mixture contains hydrofluoric acid in a sufficient amount to retard hydrolysis.

5. A process according to claim 3 wherein the potassium compound is selected from the group consisting of potassium chloride, potassium carbonate, potassium bromide, potassium hydroxide and potassium sulfide.

6. A continuous process for preparing potassium fluotantalate crystals having a density of from about 10 pounds/gallon to about 25 pounds/gallon, a particle size such that no more than about 10% pass through a −325 U.S. standard mesh screen and having occluded moisture present in an amount less than 0.04% by weight, based on the total weight of the crystals, which comprises A. forming a reaction mixture in which crystals of potassium fluotantalate form by continuously adding to an aqueous heel comprising water and potassium fluotantalate crystals (1) an aqueous solution of a potassium compound having a temperature of from about 20° C. to about 40° C. and (2) an aqueous solution of fluotantalic acid having a temperature of from about 20° C. to about 40° C. at a rate such that the potassium compound is present in the reaction mixture in an amount which about equals or slightly exceeds the stoichiometric amount needed to react with the fluotantalic acid present in said reaction mixture B. removing said reaction mixture containing potassium fluotantalate crystals.

7. A process according to claim 6 wherein the potassium compound is potassium chloride.

* * * * *